(12) United States Patent
Benz et al.

(10) Patent No.: US 10,280,565 B2
(45) Date of Patent: May 7, 2019

(54) DRAINAGE MANAGEMENT IN MULTI-PLY PAPERMAKING

(71) Applicant: Ecolab USA Inc., St. Paul, MN (US)

(72) Inventors: Bradley Benz, Naperville, IL (US); Nathan Ray Jones, Charleston, SC (US); James W. Minner, Summerville, SC (US)

(73) Assignee: Ecolab USA Inc., St. Paul, MN (US)

(*) Notice: Subject to any disclaimer, the term of this patent is extended or adjusted under 35 U.S.C. 154(b) by 0 days.

(21) Appl. No.: 15/441,623

(22) Filed: Feb. 24, 2017

(65) Prior Publication Data
US 2017/0247841 A1    Aug. 31, 2017

Related U.S. Application Data

(60) Provisional application No. 62/301,995, filed on Mar. 1, 2016, provisional application No. 62/300,253, filed on Feb. 26, 2016.

(51) Int. Cl.
*D21H 11/04* (2006.01)
*D21H 17/37* (2006.01)
(Continued)

(52) U.S. Cl.
CPC ............ *D21H 21/10* (2013.01); *B32B 29/00* (2013.01); *D21H 11/04* (2013.01);
(Continued)

(58) Field of Classification Search
CPC ...... D21H 17/375; D21H 21/10; D21H 17/30; D21H 11/04; D21H 17/11; D21H 17/37; D21H 17/55; D21F 11/04
See application file for complete search history.

(56) References Cited

U.S. PATENT DOCUMENTS 3,985,612 A * 10/1976 Watanabe ................ D21F 9/02
 162/133
4,532,008 A *  7/1985 Creagan ................. D21F 9/003
 162/203
(Continued)

FOREIGN PATENT DOCUMENTS

WO    WO 00/34581 A1    6/2000
WO    WO 00/42253 A1    7/2000
(Continued)

OTHER PUBLICATIONS

European Patent Office, International Search Report in International Patent Application No. PCT/US2017/019312, dated Apr. 24, 2017, 4 pp.

(Continued)

*Primary Examiner* — Jose A Fortuna
(74) *Attorney, Agent, or Firm* — Leydig, Voit & Mayer, Ltd.

(57) ABSTRACT

Methods of producing a multi-ply paper product are provided. The methods comprise applying coagulant and/or hybrid coagulant-flocculant composition to an upper ply substrate disposed adjacent and above a lower ply substrate in an amount such that a portion of the coagulant and/or the hybrid coagulant-flocculant composition passes through the upper ply substrate. Preferably, the lower ply substrate has a greater freeness than the upper ply substrate. The methods of the present disclosure preferably allow for efficient use of RDF chemicals while making use of the innate freeness differences between the upper and lower ply substrates.

19 Claims, 6 Drawing Sheets

(51) Int. Cl.
*D21H 17/44* (2006.01)
*D21H 17/45* (2006.01)
*D21H 19/20* (2006.01)
*D21H 21/10* (2006.01)
*D21H 27/00* (2006.01)
*D21H 27/30* (2006.01)
*B32B 29/00* (2006.01)

(52) U.S. Cl.
CPC ........... *D21H 17/375* (2013.01); *D21H 17/44* (2013.01); *D21H 17/455* (2013.01); *D21H 19/20* (2013.01); *D21H 27/002* (2013.01); *D21H 27/30* (2013.01)

(56) References Cited

U.S. PATENT DOCUMENTS

| | | | |
|---|---|---|---|
| 4,795,531 A | 1/1989 | Sofia et al. | |
| 4,913,775 A | 4/1990 | Langley et al. | |
| 5,779,859 A * | 7/1998 | Carter | D21H 23/14 162/168.2 |
| 5,906,894 A | 5/1999 | West et al. | |
| 5,935,382 A * | 8/1999 | Huovila | D21F 1/48 162/123 |
| 6,086,718 A * | 7/2000 | Carter | D21H 23/14 162/252 |
| 6,379,497 B1 | 4/2002 | Sandstrom et al. | |
| 6,413,369 B2 * | 7/2002 | Kinnunen | D21F 9/003 162/130 |
| 8,088,250 B2 | 1/2012 | Cheng et al. | |
| 8,465,623 B2 | 6/2013 | Zhao et al. | |
| 8,758,566 B2 * | 6/2014 | Virtanen | D21H 17/70 162/141 |
| 8,882,964 B2 | 11/2014 | Zhao et al. | |
| 9,034,145 B2 | 5/2015 | Castro et al. | |
| 9,103,071 B2 * | 8/2015 | Jehn-Rendu | D21H 17/44 |
| 9,328,462 B2 * | 5/2016 | Chen | D21H 27/002 |
| 9,404,223 B2 | 8/2016 | Gray et al. | |
| 2005/0257909 A1 * | 11/2005 | Lindgren | D21H 17/66 162/181.2 |
| 2006/0042767 A1 * | 3/2006 | Bhat | B32B 29/00 162/117 |
| 2006/0057365 A1 * | 3/2006 | Swoboda | B32B 29/06 428/323 |
| 2006/0065379 A1 * | 3/2006 | Babcock | B32B 29/00 162/125 |
| 2007/0215678 A1 | 9/2007 | Swoboda et al. | |
| 2007/0224419 A1 | 9/2007 | Sumnicht et al. | |
| 2008/0009596 A1 | 1/2008 | Gu et al. | |
| 2009/0165978 A1 | 7/2009 | Haigopol et al. | |
| 2010/0048768 A1 | 2/2010 | Solhage | |
| 2010/0122786 A1 | 5/2010 | Jacobson et al. | |
| 2010/0282424 A1 * | 11/2010 | Koch | D21H 21/10 162/164.6 |
| 2010/0314059 A1 | 12/2010 | Edwards et al. | |
| 2010/0319864 A1 * | 12/2010 | Bhat | B32B 29/00 162/109 |
| 2011/0155339 A1 | 6/2011 | Brungardt et al. | |
| 2013/0146240 A1 | 6/2013 | Mohan et al. | |
| 2013/0255898 A1 | 10/2013 | Redd et al. | |
| 2014/0124155 A1 * | 5/2014 | Jehn-Rendu | D21H 17/44 162/168.3 |
| 2014/0174684 A1 | 6/2014 | Hong et al. | |
| 2015/0144563 A1 | 5/2015 | McKiernan et al. | |
| 2015/0197893 A1 | 7/2015 | Cheng et al. | |
| 2016/0097161 A1 * | 4/2016 | Benz | D21H 17/375 162/164.6 |
| 2016/0273166 A1 | 9/2016 | Karppi et al. | |
| 2017/0247841 A1 * | 8/2017 | Benz | D21H 21/10 |

FOREIGN PATENT DOCUMENTS

| | | | |
|---|---|---|---|
| WO | WO 2007/131874 A1 | 11/2007 | |
| WO | WO-2017147392 A1 * | 8/2017 | D21H 27/30 |

OTHER PUBLICATIONS

European Patent Office, Written Opinion in International Patent Application No. PCT/US2017/019312, dated Apr. 24, 2017, 6 pp.

* cited by examiner

DRAINAGE MANAGEMENT IN MULTI-PLY PAPERMAKING

CROSS-REFERENCE TO RELATED APPLICATIONS

This application claims the benefit of each of U.S. Provisional Patent Application Nos. 62/300,253 and 62/301,995, filed Feb. 26, 2016, and Mar. 1, 2016, respectively, the disclosures of which are incorporated by reference herein in their entireties for all purposes.

STATEMENT REGARDING FEDERALLY SPONSORED RESEARCH OR DEVELOPMENT

Not Applicable.

BACKGROUND OF THE INVENTION

The invention relates to compositions, methods, and apparatuses for improving the formation, drainage, combination, and the resulting properties of multi-ply paper including but not limited to paperboard. Paperboard is stiff and thick paper whose various grades include: linerboard, foodboard, cartonboard, boxboard, chip board, base board, gypsum board, cardboard, and oaktag. Often paperboard is constructed out of multiple layers or plies allowing for the use of inexpensive raw materials which can be used to optimize between properties such as thickness, density, fiber strength and the like. Coordinating the simultaneous formation and combination of the various plies however can be a complex endeavor which may impose difficulties and costs. Thus there is clear utility in novel compositions, methods, and apparatuses for improving the formation, drainage, combination, and the resulting properties of multi-ply paper sheets including paperboard.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

To satisfy the long-felt but unsolved needs identified herein, at least one embodiment of the invention is directed toward a method of producing multi-ply paper. The method comprises positioning an upper ply substrate over a lower ply substrate, applying a composition into the upper ply substrate such that a portion of composition disperses within the upper ply substrate and a portion of the composition passes through the upper ply substrate and drains onto and through the lower ply substrate.

The composition may be applied to the upper ply substrate by dosing the composition at a location above or into the furnish of the upper ply substrate. Both plies may previously have exited from the same headbox or individual headboxes. The composition may be added while at least one of the substrates is positioned on a fourdrinier wire. The upper ply substrate may have a freeness that is at least 10% less than the lower ply substrate. The portion of the composition that remains within the upper ply substrate may become dispersed throughout the upper ply substrate, but the composition that drains onto and through the lower ply substrate may be less evenly distributed throughout the lower ply substrate. The composition may be an RDF composition. The composition may comprise at least one of a siliceous material, starch, microparticle, flocculant, coagulant, and any combination thereof. The composition may be cationic, anionic, amphoteric, or uncharged.

The method may further comprise contacting the substrates to each other to form a multi-ply paper. Relative to the upper ply substrate, the lower ply substrate may contain a greater amount of: low grade material, inorganic filler particles, precipitated calcium carbonate, ground calcium carbonate, recycled fiber, broke, ink, pigment, coating, and any combination thereof.

The method may further comprise the step of forming paperboard from the two substrates, or additional substrates.

Furthermore, a method of treating a multi-ply paper production process is provided. The multi-ply paper production process comprises an upper ply substrate and a lower ply substrate disposed adjacent to and below the upper ply substrate. The upper and lower ply substrates are passing through the multi-ply paper production process. The method comprises applying coagulant and/or hybrid coagulant-flocculant composition to the upper ply substrate in amounts such that a portion of the coagulant and/or the hybrid coagulant-flocculant composition pass through the upper ply substrate and drain onto the lower ply substrate.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"CSF" means Canadian Standard Freeness as described by TAPPI methods and standards and measured in milliliters.

"Freeness" means the measure of the rate at which a suspension of pulp may be drained and is typically measured according to the Canadian Standard Freeness test, as defined by TAPPI methods and standards, freeness is also further described in is further described in the reference *Handbook for Pulp and Paper Technologists,* 3rd Edition, by Gary A. Smook, Angus Wilde Publications Inc., in general and in particular pages 335-38. As it relates to this application, freeness is measured at the headbox of the respective substrate.

"Multi-ply" means a paper sheet formed from the vertical layering together of multiple plies, it is also further described in the reference *Handbook for Pulp and Paper Technologists,* 3rd Edition, by Gary A. Smook, Angus Wilde Publications Inc., in general and in particular pages 299-309.

"Ply" means a discrete paper substrate that typically has exited a headbox and that will ultimately be positioned above or below at least one other discrete paper substrate to form a multi-ply paper product.

"Consisting essentially of" means that the methods and compositions may include additional steps, components, ingredients or the like, but only if the additional steps, components and/or ingredients do not materially alter the basic and novel characteristics of the claimed methods and compositions.

"DADMAC" means monomeric units of diallyldimethylammonium chloride, DADMAC can be present in a homopolymer (e.g., polyDADMAC), or in a copolymer, terpolymer, etc., which comprises other monomeric units.

"Dry end" means that portion of the papermaking process including and subsequent to a press section where a liquid medium such as water typically comprises less than 45% of the mass of the substrate. A dry end includes, but is not limited to, the size press portion of a papermaking process. Additives added in a dry end typically remain in a distinct coating layer outside of the slurry.

"Dry strength" means the tendency of a paper substrate to resist damage due to shear force(s). An example of dry strength is surface strength.

"Effective amount" means a dosage of any additive that affords an increase in one of the three quartiles when compared to an undosed control sample.

"GCC" means ground calcium carbonate filler particles, which are manufactured by grinding naturally occurring calcium carbonate bearing rock.

"GPAM" means glyoxalated polyacrylamide, which is a polymer made from polymerized acrylamide monomers (which may or may not be a copolymer comprising one or more other monomers as well) and in which acrylamide polymeric units have been reacted with glyoxal groups. Representative examples of GPAM are described in U.S. Published Patent Application No. 2009/0165978.

"High charge density" means having a relatively high ratio of the number of charged sites (anionic or cationic) on a polymer compared to the molecular weight of the polymer. Charge density can be expressed as the number of milliequivalents of charge per gram of polymer (meq/g) such that a "high charge density" is not less than 1 meq/g.

"Interface" means the boundary between two substrates of a multi-ply paper sheet.

"Microparticle" means a dispersed-phase particle of a colloidal system. Generally, "microparticle" refers to particles that have a diameter of from 1 nm to 100 nm. Generally, microparticles are too small to be seen by the naked eye because microparticles are smaller than the wavelength of visible light.

"Mer units" means the composition of matter which is either in the form of monomer units of the type to be used in a polymer synthesis or is in the form of the repeating units present in a polymer.

"Paper product" means the end product of a papermaking process. Paper product includes, but is not limited to, writing paper, printer paper, tissue paper, cardboard, paperboard, and packaging paper.

"Papermaking process" means any portion of a method of making paper products from pulp comprising forming an aqueous cellulosic papermaking furnish, draining the furnish to form a sheet, and drying the sheet. The steps of forming the papermaking furnish, draining and drying may be carried out in any conventional manner generally known to those skilled in the art. The papermaking process may also include a pulping stage, e.g., making pulp from a lignocellulosic raw material, and bleaching stage, e.g., chemical treatment of the pulp for brightness improvement. Papermaking processes are further described in the reference *Handbook for Pulp and Paper Technologists,* 3rd Edition, by Gary A. Smook, Angus Wilde Publications Inc., (2002) and *The Nalco Water Handbook* (3rd Edition), by Daniel Flynn, McGraw Hill (2009) in general, and in particular pages 32.1-32.44.

"RSV" means reduced specific viscosity, an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

Wherein $\eta$=viscosity of polymer solution; $\eta_o$=viscosity of solvent at the same temperature; and c=concentration of polymer in solution. As used herein, the units of concentration ("c") are (grams/deciliter). Therefore, the units of RSV are deciliters per gram (dL/g). RSV is measured at 30° C. The viscosities $\eta$ and $\eta_o$ are measured using a Cannon-Ubbelohde semimicro dilution viscometer, size 75. The viscometer is mounted in a vertical position in a constant temperature bath adjusted to 30±0.02° C. The error inherent in the calculation of RSV is about 2 dL/g. Similar RSVs measured for two linear polymers of identical or very similar composition is one indication that the polymers have similar molecular weights, provided that the polymer samples are treated identically and that the RSVs are measured under essentially identical conditions.

"Substrate" means a mass containing paper fibers passing through or having passed through a papermaking process. Substrates include, for example, wet web, paper mat, slurry, paper sheet, and paper products.

"Surface strength" means the tendency of a paper substrate to resist damage due to abrasive force.

"Surfactant," as used without modification, includes any of anionic, nonionic, cationic, and zwitterionic surfactants. Descriptions of surfactants are provided in *Kirk-Othmer, Encyclopedia of Chemical Technology,* Third Edition, volume 8, pages 900-12, and in *McCutcheon's Emulsifiers and Detergents,* each of which is incorporated herein by reference.

"Wet end" means the portion of a papermaking process prior to a press section where a liquid medium (e.g., water) comprises more than about 45% of the mass of the pulp slurry or furnish. Generally, additives added in a wet end penetrate and distribute within the pulp slurry or furnish.

"Wet strength" means the tendency of a paper substrate to resist damage due to shear force(s) while the substrate is wet.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005) (Published by Wiley, John & Sons, Inc.) this definition shall control how the term is to be defined in the claims. All illustrated chemical structures also include all possible stereoisomer alternatives.

A method of treating a multi-ply paper production process is provided. The method involves applying a dosage of coagulant (e.g., from about 10 lb to about 50 lb of total coagulant composition per ton of dry pulp of the upper ply substrate, i.e., from about 3.5 lb to about 18.5 lb of active coagulant per ton of dry pulp of the upper ply substrate) and hybrid coagulant-flocculant composition (e.g., from about 1 lb to about 20 lb of total hybrid coagulant-flocculant composition per ton of dry pulp of the upper ply substrate, i.e., from about 0.35 lb to about 7 lb of active hybrid coagulant-flocculant composition per ton of dry pulp of the upper ply substrate) to an upper ply substrate positioned above another substrate (i.e., a lower ply substrate) such that a portion of the coagulant and the hybrid coagulant-flocculant composition pass through the upper ply substrate and drain onto the lower ply substrate. The method has been shown to provide beneficial results related to freeness and charge distribution of either and/or both of the upper and lower ply substrates. In certain embodiments of the method, the coagulant and the hybrid coagulant-flocculant composition further passes through some or all of the lower ply substrate. In certain embodiments of the methods disclosed herein, the upper ply substrate comprises kraft pulp, for example, from about 50 wt % to about 90 wt %, or to about 95 wt %, or to about 99 wt % or to 100 wt % kraft pulp. In certain embodiments of the methods disclosed herein, a dry section of the upper ply substrate weighs from 1% to 20% of an equal length and width of a dry section of lower ply substrate.

In certain embodiments of the methods provided herein, the upper ply substrate and/or the lower ply substrate comprises kraft pulp. In certain embodiments of the methods provided herein, the kraft pulp comprises unbleached hardwood kraft pulp, unbleached softwood kraft pulp, or a combination thereof. The upper ply substrate and/or the lower ply substrate may comprise recycled fiber and/or broke fiber.

Generally, a multi-ply paper product is formed from two (or more) substrates (e.g., layers or plies). The multi-ply paper product may be produced by using various suspension flows exiting from a headbox that are simultaneously drained in a single web-formation zone. One or more types of raw materials (e.g., pulps, fillers, etc.) can be used to structure the substrate into a web. Representative examples of multi-ply paper production processes include, but are not limited to, those described in U.S. Pat. Nos. 6,627,042, 6,919,111, 5,584,967, 5,916,417, 7,879,192, as well as U.S. Published Patent Application No. 2007/0215301.

In certain embodiments of the methods provided herein, coagulant and hybrid coagulant-flocculant composition are applied to the upper ply substrate upstream of a headbox of the upper ply substrate. In certain embodiments of the methods provided herein, coagulant and hybrid coagulant-flocculant composition are applied at a fan pump (e.g., the suction of a fan pump) of the upper ply substrate. In certain embodiments of the methods provided herein, coagulant and hybrid coagulant-flocculant composition are applied to the upper ply substrate at a location at or upstream from the location where the upper ply substrate contacts the lower ply substrate.

In certain embodiments of the methods provided herein, coagulant and hybrid coagulant-flocculant composition are added at a location at or downstream of a location immediately after a ply exits a headbox on the same forming wire (e.g., Fourdrinier wire). Representative examples of forming wires can be found in the reference *Handbook for Pulp and Paper Technologists, 3rd Edition*, by Gary A. Smook, Angus Wilde Publications Inc., in general and in particular pages 227-47.

As it relates to the present application, "coagulant" refers to a water treatment chemical used in a solid-liquid separation stage to neutralize charges of suspended particles so that the particles can agglomerate. Generally, coagulants may be categorized as cationic, anionic, amphoteric, or zwitterionic. Furthermore, coagulants may be categorized as inorganic coagulants, organic coagulants, and blends thereof. Inorganic coagulants include, e.g., aluminum or iron salts, such as aluminum sulfate, aluminum choride, ferric chloride, ferric sulfate, polyaluminum chloride, and/or aluminum chloride hydrate.

Generally, organic coagulants are positively charged (i.e., cationic) polymeric compounds having relatively low molecular weight (e.g., from about 200 daltons to about 100,000 daltons). In certain embodiments of the methods disclosed herein, the organic cationic coagulant utilized in the methods disclosed herein is selected from homopolymers of mer units selected from diallyldimethylammonium chloride ("DADMAC"), dialkylaminoalkyl acrylate and/or a dialkylaminoalkyl methacrylate, or their quaternary or acid salts, including, but not limited to, dimethylaminoethyl acrylate methyl chloride quaternary salt ("DMAEA•MCQ"), dimethylaminoethyl acrylate methyl sulfate quaternary salt, dimethyaminoethyl acrylate benzyl chloride quaternary salt ("DMAEA•BCQ"), dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride. In certain embodiments, the organic cationic coagulant is selected from poly-diallyldimethylammonium chloride ("pDAD-MAC" or "polyDADMAC"), epichlorohydrin-dimethyamine copolymer ("epi-DMA"), diallylamine ("DAA"), DMAEA•MCQ, DMAEA•BCQ derivatives thereof, multiples thereof, and combinations thereof. Copolymers, terpolymers, etc., of the aforementioned mer units may be coagulants, if the copolymers, terpolymers, etc., meet the criteria of a coagulant.

Generally, coagulants have greater charge density and less molecular weight than flocculants and hybrid coagulant-flocculant compositions. Coagulant may be added to liquid containing suspended particles to aid in the destabilization and aggregation of the suspended particles via ionic charge neutralization. Additional properties and examples of coagulants are provided in *Kirk-Othmer Encyclopedia of Chemical Technology*, 5th Edition, (2005), (Published by Wiley, John & Sons, Inc.). In certain embodiments of the methods provided herein, the coagulant is cationic, organic, and has a charge density of from about 0.5 meq/g to about 14 meq/g, for example, from about 0.5 meq/g, or from about 1 meq/g, or from about 2 meq/g, or from about 3 meq/g, or from about 4 meq/g, or from about 5 meq/g, to about 14 meq/g, or to about 12 meq/g, or to about 10 meq/g, or to about 9 meq/g, or to about 8 meq/g, or to about 7 meq/g. In certain embodiments, a coagulant utilized in the methods disclosed herein is cationic and has a charge density of from about 4 meq/g to about 8 meq/g, or more preferably from about 5 meq/g to about 7 meq/g.

In certain embodiments of the methods disclosed herein, from about 10 pounds to about 50 pounds per ton dry pulp of the upper ply substrate (i.e., lb/ton) of coagulant is applied to the upper ply substrate, including from about 10 lb/ton, or from about 20 lb/ton, to about 50 lb/ton, or to about 40 lb/ton, or to about 30 lb/ton. In certain embodiments, from about 20 lb to about 30 lb of coagulant per ton of dry pulp of the upper ply substrate is added to the upper ply substrate. Note that pounds of coagulant values provided in this paragraph are based on the entire coagulant composition being applied to the upper ply substrate (i.e., including inactive ingredients such as, e.g., water, solvent(s), and or surfactant(s)).

In certain embodiments of the methods disclosed herein, from about 3.5 pounds to about 18.5 pounds per ton dry pulp of the upper ply substrate (i.e., lb/ton) of coagulant is applied to the upper ply substrate, including from about 3.5 lb/ton, or from about 7 lb/ton, to about 18.5 lb/ton, or to about 14 lb/ton, or to about 10.5 lb/ton. In certain embodiments, from about 7 lb to about 10.5 lb of coagulant per ton of dry pulp of the upper ply substrate is added to the upper ply substrate. Note that pounds of coagulant values provided in this paragraph are based on active coagulant being applied to the upper ply substrate (i.e., excluding inactive ingredients such as, e.g., water, solvent(s), and or surfactant(s)).

As it relates to the present application, "flocculant" is a composition of matter that, when added to a liquid carrier phase within which particles are thermodynamically inclined to disperse, induces agglomeration of the particles as a result of weak physical forces such as surface tension and adsorption. Flocculation often involves the formation of discrete globules of particles aggregated together with films of liquid carrier interposed between the particles that make up the aggregated globules. As used herein, flocculation includes those descriptions recited in ASTME 20-85 as well as those recited in *Kirk-Othmer Encyclopedia of Chemical Technology*, 5th Edition, (2005), (Published by Wiley, John & Sons, Inc.). Generally, flocculants may be created using one or more of the mer units identified as present in coagulants, but can be differentiated from coagulants by flocculants' relatively high molecular weight (e.g., in excess of 1,000,000 daltons, or from about 1,000,000 daltons to about 30,000,000 daltons).

In certain embodiments, hybrid coagulant-flocculant composition is applied to the upper ply substrate. While hybrid coagulant-flocculant compositions can be categorized as flocculants, hybrid coagulant-flocculant compositions are a subset of flocculants that, when used in certain applications, impart some of the properties of coagulants. Generally, a hybrid coagulant-flocculant composition is a substance that has properties that lie "between" those of coagulants and those of flocculants. For example, a hybrid coagulant-flocculant composition generally has a charge density of from about 0.5 meq/g to about 10 meq/g, but has a molecular weight ranging from about 100,000 daltons to about 1,000,000 daltons (i.e., relatively high compared to the molecular weights of coagulants). Generally, hybrid coagulant-flocculant compositions have RSV values of from 3 to 12, the values of which lie between those of coagulants (coagulant RSV<3) and flocculants (flocculant RSV>12).

An example of a hybrid coagulant-flocculant composition is a cationic copolymer comprising acrylamide and at least one additional cationic mer unit. In certain embodiments of the methods disclosed herein, the at least one additional cationic mer unit is selected from a dialkylaminoalkyl acrylate and/or a dialkylaminoalkyl methacrylate, or their quaternary or acid salts, including, but not limited to, dimethylaminoethyl acrylate methyl chloride quaternary salt ("DMAEA•MCQ"), dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride ("DADMAC"), derivatives thereof, multiples thereof, and combinations thereof. When present, alkyl groups are generally $C_1$ to $C_4$ alkyl. In certain embodiments of the methods disclosed herein, the additional cationic mer unit is selected from DADMAC, an allylamine, a diallylamine, dialkylaminoalkyl (meth)acrylate (and quaternary or acid salts thereof), derivatives thereof, multiples thereof, and combinations thereof. In certain embodiments of the methods disclosed herein, the hybrid coagulant-flocculant composition is a copolymer comprising acrylamide and DADMAC.

In certain embodiments of the methods disclosed herein, from about 1 pound to about 20 pounds of hybrid coagulant-flocculant composition per ton of dry pulp of the upper ply substrate (lb/ton) is applied to the upper ply substrate, or from about 1 lb/ton, or from about 2 lb/ton, or from about 3 lb/ton, to about 20 lb/ton, or to about 15 lb/ton, or to about 12 lb/ton, or to about 10 lb/ton, or to about 9 lb/ton, or to about 8 lb/ton, or to about 7 lb/ton of hybrid coagulant-flocculant composition. In certain embodiments of the methods disclosed herein, from about 3 pounds to about 7 pounds of hybrid coagulant-flocculant composition per ton of dry pulp of the upper ply substrate is applied to the upper ply substrate. Note that pounds of hybrid coagulant-flocculant composition values provided in this paragraph are based on the entire hybrid coagulant-flocculant composition being applied to the upper ply substrate (i.e., including inactive ingredients such as, e.g., water, solvent(s), and or surfactant(s)).

In certain embodiments of the methods disclosed herein, from about 0.35 pounds to about 7 pounds per ton dry pulp of the upper ply substrate (i.e., lb/ton) of hybrid coagulant-flocculant composition is applied to the upper ply substrate, including from about 0.35 lb/ton, or from about 0.7 lb/ton, or from about 1.05 lb/ton, to about 7 lb/ton, or to about 5.25 lb/ton, or to about 4.2 lb/ton, or to about 3.5 lb/ton, or to about 3.15 lb/ton, or to about 2.8 lb/ton, or to about 2.45 lb/ton of hybrid coagulant-flocculant composition. Note that pounds of hybrid coagulant-flocculant composition values provided in this paragraph are based on active hybrid coagulant-flocculant composition being applied to the upper ply substrate (i.e., excluding inactive ingredients such as, e.g., water, solvent(s), and or surfactant(s)).

In certain embodiments of the methods disclosed herein, the hybrid coagulant-flocculant composition comprises from about 50 mol % acrylamide mer units to from about 95 mol % acrylamide mer units, or from about 50 mol % acrylamide mer units, or from about 55 mol % acrylamide mer units, or from about 60 mol % acrylamide mer units, or from about 65 mol % acrylamide mer units, to about 95 mol % acrylamide mer units, or to about 90 mol % acrylamide mer units or to about 85 mol % acrylamide mer units, or to about 80 mol % acrylamide mer units.

In certain embodiments of the methods disclosed herein, coagulant and hybrid coagulant-flocculant composition are applied to the upper ply substrate in the form of an RDF composition. An RDF composition may comprise one or more of a cationic, anionic, amphoteric, or uncharged: siliceous material, starch, microparticle, flocculant, and/or a coagulant. The RDF composition may comprise one or more of polyvalent cations, alum, rosin, barium dispersant, starch, polyaluminum species, polyethyleneamine, polyethyleneimine, poly-DADMAC, polyamines, polyamideamine, polyamidoamine, epichlorohydrin, polyvinylamine, ethylenedichloride-ammonia polymers, copolymers of cationic monomers and acrylamide, polyethylene oxide, derivatives thereof, multiples thereof, and combinations thereof.

When utilized, an RDF composition imparts properties to a substrate that enhances retention-drainage-formation characteristics. Enhanced retention-drainage-formation characteristics tend to facilitate freeness of a substrate without undue loss of solids or desired chemicals from the substrate. Generally, RDF compositions comprise compounds that impart electrochemical interactions between oppositely charged chemicals and substrate components. Depending on the ingredients found in a particular substrate, an RDF composition may comprise one or more components, e.g., siliceous material, starch, microparticles, flocculant, or coagulant, and each component may be cationic, anionic, amphoteric, zwitterionic, multiply-charged, or non-charged. RDF compositions are further described in, e.g., U.S. Patent Application Publication No. 2010/0122786 and the chapter titled "Retention and Drainage" in *Papermaking Chemistry*, by Norell, Johansson & Persson, (1999), In L. Neimo, (pages 42-81). Helsinki: Fapet Oy.

As it relates to the present application, an example of an RDF composition is a composition comprising a cationic coagulant having a charge density of from about 4 meq/g to about 8 meq/g and a hybrid coagulant-flocculant composition (i.e., "hybrid") as described herein. Preferably, the cationic coagulant and the hybrid coagulant-flocculant composition are present in the RDF composition at a cationic coagulant-to-hybrid weight ratio of from about 10:1 to about 2:1. In certain embodiments, the cationic coagulant of the RDF composition is selected from poly-diallyldimethylammonium chloride ("pDADMAC" or "polyDADMAC"), epichlorohydrin-dimethyamine copolymer ("epi-DMA"), diallylamine ("DAA"), derivatives thereof, multiples thereof, and combinations thereof. In certain embodiments, the hybrid coagulant-flocculant composition of the RDF composition is selected from is a cationic copolymer comprising acrylamide and at least one additional cationic mer unit, derivatives thereof, multiples thereof, and combinations thereof, wherein the at least one additional cationic mer unit preferably comprises one of the mer units described herein.

Making use of the different freeness of different plies makes efficient use of circumstances innate to multi-ply paper manufacture. Depending on whether a particular ply is to be a more inner or a more outer ply, the content and freeness of the plies may differ. Generally, plies to be positioned at an inner location of the multi-ply paper product may comprise a relatively greater content of low grade materials, e.g., filler (including, but not limited to, precipitated calcium carbonate, ground calcium carbonate, and the like), recycled fibers, extraneous materials (e.g., ink, pigment, coating, etc.). Generally, low grade materials have different charges and/or charge densities, which can affect freeness of a ply that contains low grade materials. Thus, different plies generally have different freenesses.

In certain embodiments of the methods disclosed herein, the lower ply substrate has a greater freeness than the upper ply substrate. As a result, it is believed that a relatively large amount (e.g., 60-90 wt %) of the coagulant and hybrid coagulant-flocculant composition will become distributed throughout the upper ply substrate, with the remaining portion believed to drain onto (and at least a portion thereof through) the lower ply substrate. In at least one embodiment the coagulant and hybrid coagulant-flocculant composition will become as effectively distributed throughout the lower ply substrate as the upper ply substrate. In at least one embodiment the lower ply substrate is made into a more inner ply of the multi-ply paper product than the upper ply substrate.

To a large extent the passage of the coagulant and hybrid coagulant-flocculant composition is a result of the effects of electrostatic charges. For coagulants and hybrid coagulant-flocculant compositions utilized in the methods disclosed herein, the retained coagulant(s) and hybrid(s) are generally smaller (and often substantially smaller) than the open spaces in the wire the substrate is suspended upon. Generally, the coagulant(s) and hybrid(s) are retained by electrostatic charges that hold water soluble particles in place while water drains out through the wire. In at least one embodiment the electrostatic charge in the upper ply substrate tends to retain coagulant(s) and hybrid(s) more than the electrostatic charge in the lower ply substrate. Thus, in certain embodiments, the coagulant(s) and hybrid(s) pass more easily through the lower ply than the upper ply.

In an embodiment of the methods provided herein, the coagulant and hybrid coagulant-flocculant composition are applied to the upper ply substrate in an amount so as to cause a dosage of from about 1 lb to about 10 lb per ton dry pulp (e.g., a "low dose") to pass to the lower ply substrate.

In certain embodiments of the methods disclosed herein, freeness properties of the upper and lower ply substrates are varied. For example, in certain embodiments of the methods disclosed herein, the freeness of the upper ply substrate is 1 to 20 times less, or 1.5 to 20 times less, or 2 to 20 times less, or 2 to 10 times less, or 2 to 5 times less, than the freeness of the lower ply substrate. As a result, the upper ply substrate may not drain as efficiently as the lower ply substrate, which could result in a multi-ply sheet leaving the wet-end that is relatively high in moisture content and requires increased drying (steam) demand. Generally, the lower ply substrate freeness may be very high and may allow water, coagulant(s) and hybrid(s), among other components, to freely drain through the wire with or without the application of further chemical additive.

In certain embodiments of the methods provided herein, an increase in freeness, particularly of the upper ply substrate, allows for a papermaking machine to run at a faster speed. Generally, efficiency of a papermaking process is optimized based on moisture content in the substrate at certain locations in the process (including but not limited to the end of the wet-end, i.e., just before the press). When a substrate contains more moisture than necessary, additional latent heat (steam demand) is required to remove excess moisture from the substrate. However, excess drainage results in a loss of various desired paper properties. Thus, preferably, the machine is run at optimal speed, e.g., a speed coordinated to provide desired moisture content at one or more certain locations. In at least one embodiment, but for the application of the coagulant and hybrid coagulant-flocculant composition to the upper ply substrate, the optimal speed is slower than the optimal speed when the coagulant and hybrid coagulant-flocculant composition have been applied. In at least one embodiment, the substrate has a moisture content of from about 4% to about 15% by weight when the substrate exits the dry-end.

Generally, the speed of the papermaking machine is limited by the amount of water removal that has occurred in the upper ply substrate because the lower ply substrate generally has greater freeness. If the upper and lower ply substrates drain at substantially different rates, the papermaking machine speed will be less than the optimal speed, inferring that the slower draining upper ply substrate is a rate limiting factor. This poses a difficulty for multi-ply manufacturing. For example, to remedy the difference in drainage between the upper and lower ply substrates, the rolling mechanism of the faster draining ply may be slowed to match the speed of the slower-draining substrate. Alternatively or in combination, a relatively complicated method of coordinating the two dissimilar draining speeds may be utilized. Either of the aforementioned remedies results in either unwanted complexity or decreased output per unit of time.

An example of this problem occurs by the production of food packaging. Food packaging often requires the use of at least two plies, one optimized for wet strength properties and one optimized for dry strength properties. Generally, the dry strength optimized ply does not drain as quickly as the wet strength optimized ply. The differences in drainage have resulted in a speed gap of up to 80 ft/min or even higher. In certain embodiments of the methods disclosed herein, the multi-ply paper product is food packaging.

In at least one embodiment the invention facilitates optimizing freeness. Low freeness pulp may be utilized in the upper ply substrate and meet quality specifications of the finished product. The disclosed methods allow for the use of low freeness pulp while taking advantage of the increased drainage through the lower ply substrate.

In certain embodiments of the methods disclosed herein, the lower ply substrate has a freeness of from about 200 mls to about 800 mls, or from about 200 mls, or from about 300 mls, or from about 400 mls, or from about 500 mls, to about 800 mls, or to about 700 mls. In certain embodiments, the lower ply substrate has a freeness of about 500 mls, to about 700 mls.

In certain embodiments of the methods disclosed herein, the upper ply substrate has a freeness of about 1 mls to about 400 mls, or from about 1 mls, or from about 10 mls, or from about 20 mls, or from about 30 mls, to about 400 mls, or to about 300 mls, or to about 200 mls. In certain embodiments, the upper ply substrate has a freeness of from about 30 mls to about 200 mls. The abbreviation "mls" is short for milliliter(s), per the Canadian Freeness Test protocol.

In certain embodiments of the methods disclosed herein, from about 1 wt %, or from about 10 wt %, or from about 20 wt %, or from about 30 wt %, or from about 40 wt %, or from about 50 wt %, to about 99 wt %, or to about 95 wt % or to about 90 wt %, or to about 85 wt %, or to about 80 wt %, or to about 75 wt %, or to about 70 wt % of the coagulant and hybrid coagulant-flocculant composition applied to the upper ply substrate passes through the upper ply substrate and drains onto the lower ply substrate.

Without being limited by a particular theory, it is believed that the hybrid coagulant-flocculant composition forms a structure having a morphology that mimics that seen in wet strength resins such as poly(aminoamide)-epichlorohydrin) resin ("PAE") cross-linked polymers. When utilized, these wet strength resins form high molecular weight, high charge density arrangements in paper substrates that increase freeness along with wet strength properties. The hybrid coagulant-flocculant composition imparts similar freeness but without the wet strength properties of, e.g., the PAE cross-linked polymers. As a result they are ideal for use in non-wet-strength plies such as upper ply substrates.

The methods disclosed herein result in a number of unexpected beneficial results. As previously mentioned, PAE cross-linked polymers result in increased freeness but do not afford properties beneficial to upper ply substrates. In addition wet-strength optimized paper is often difficult to recycle because, generally, wet-strength optimized paper is not easily re-pulped. In contrast, multi-ply paper product produced according to the methods disclosed herein does not tend to over-flocculate and is more suitable to be re-pulped and recycled.

In at least one embodiment, at least one of the upper and lower ply substrates excludes the presence of a wet-strength agent/resin. In at least one embodiment, at least one of the upper and lower ply substrates excludes the presence of PAE cross-linked polymer/copolymer.

Some discussions of wet strength, wet-end, dry-end, and dry strength can be found in U.S. Pat. No. 9,034,145, which uses the terms "wet strength" and "wet web strength" for what is collectively referred to herein as "wet-strength."

The foregoing may be better understood by reference to the following examples, which are presented for purposes of illustration and are not intended to limit the scope of the invention. The examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

EXAMPLES

Set 1:

A number of trials were performed at a paper mill producing a two ply paper sheet (an example of a multi-ply paper product). The plies were each formed while positioned such that one ply (e.g., an upper ply substrate) was positioned above the other (e.g., a lower ply substrate), with the lower ply being formed prior to the upper ply being formed. This is different than the typical process where the two sheets are separately formed and then positioned against each other. The lower ply was targeted to have superior dry strength properties and was largely made up of softwood with a refining load of 2-3 hpd/ton of dry fiber of the lower ply. The upper ply was targeted to have superior printing qualities and was largely made up of hardwood with a refining load of 7-8 hpd/ton of dry fiber of the upper ply.

The speed at which the machine was run was slaved to a control unit that measured moisture content of the overall two-ply paper substrate at the conclusion of the dry-end. The control unit automatically either decreased the speed if one ply exceeded the targeted moisture content or increased the speed if one ply did not exceed the targeted moisture content. In other words, the measured speed proportionally indicates the effectiveness of the drainage rate.

In a control test, a commercially available hybrid coagulant-flocculant composition was directly applied to the lower ply substrate. The dosage was approximately 5 lbs of hybrid coagulant-flocculant composition, in this case acrylamide-DMAEA•MCQ (available as Nalco 61579 from Ecolab, 1601 West Diehl Road, Naperville, Ill. 60563), measured as total hybrid coagulant-flocculant composition, per ton of dry pulp of the lower ply substrate (i.e., 1.75 lb/ton as active hybrid coagulant-flocculant composition for this particular hybrid coagulant-flocculant composition). Either no change or a slowing in drainage of the lower ply was observed. This was believed to have been because the lower ply substrate had been previously treated to have high freeness, so the addition of hybrid coagulant-flocculant composition was redundant.

Figure 1:
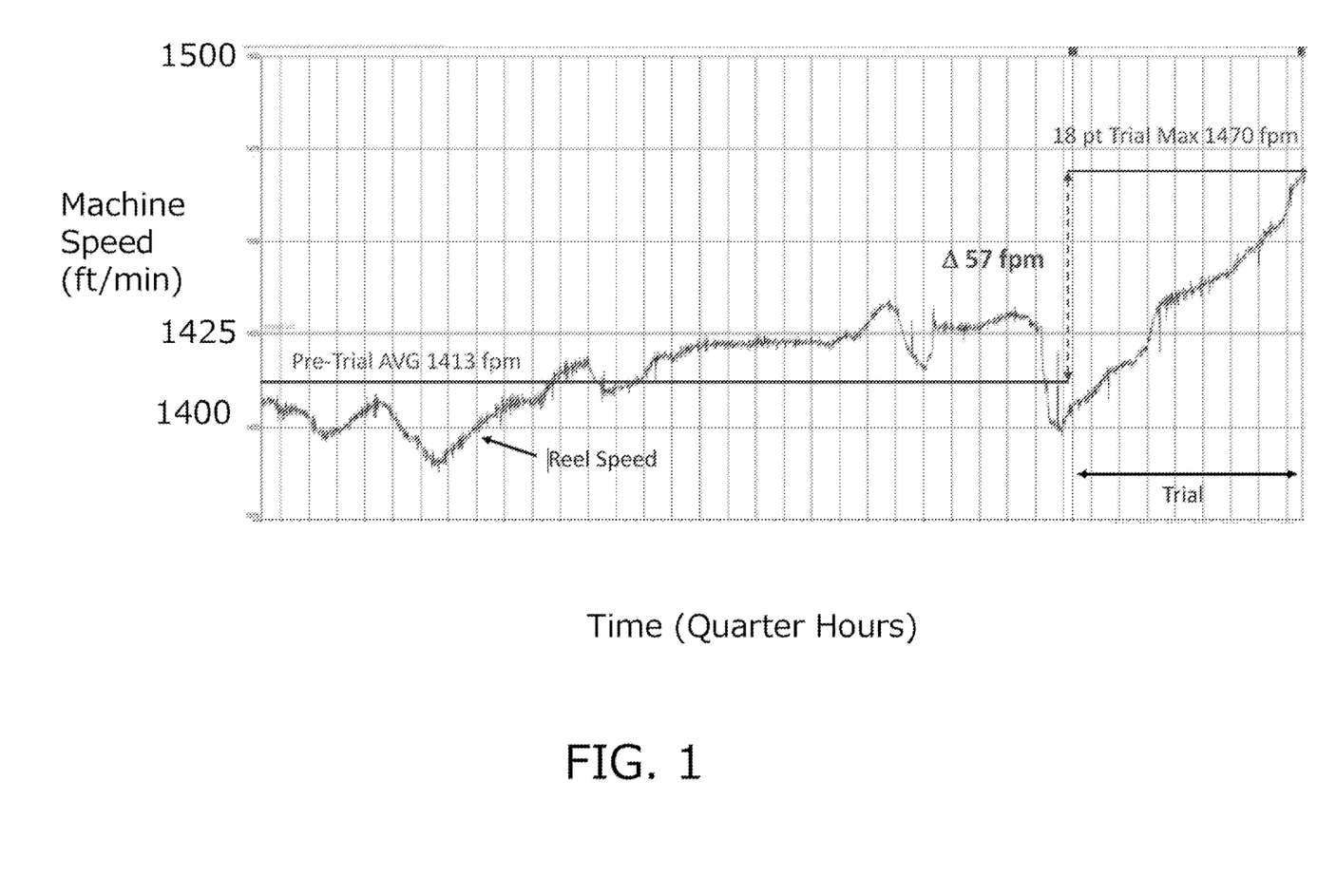
FIG. 1 is a graph of the results of Set 1 of the Examples demonstrating that the methods provided herein improved the freeness of a paper ply as demonstrated by an increase in paper machine speed.
Figure 2:
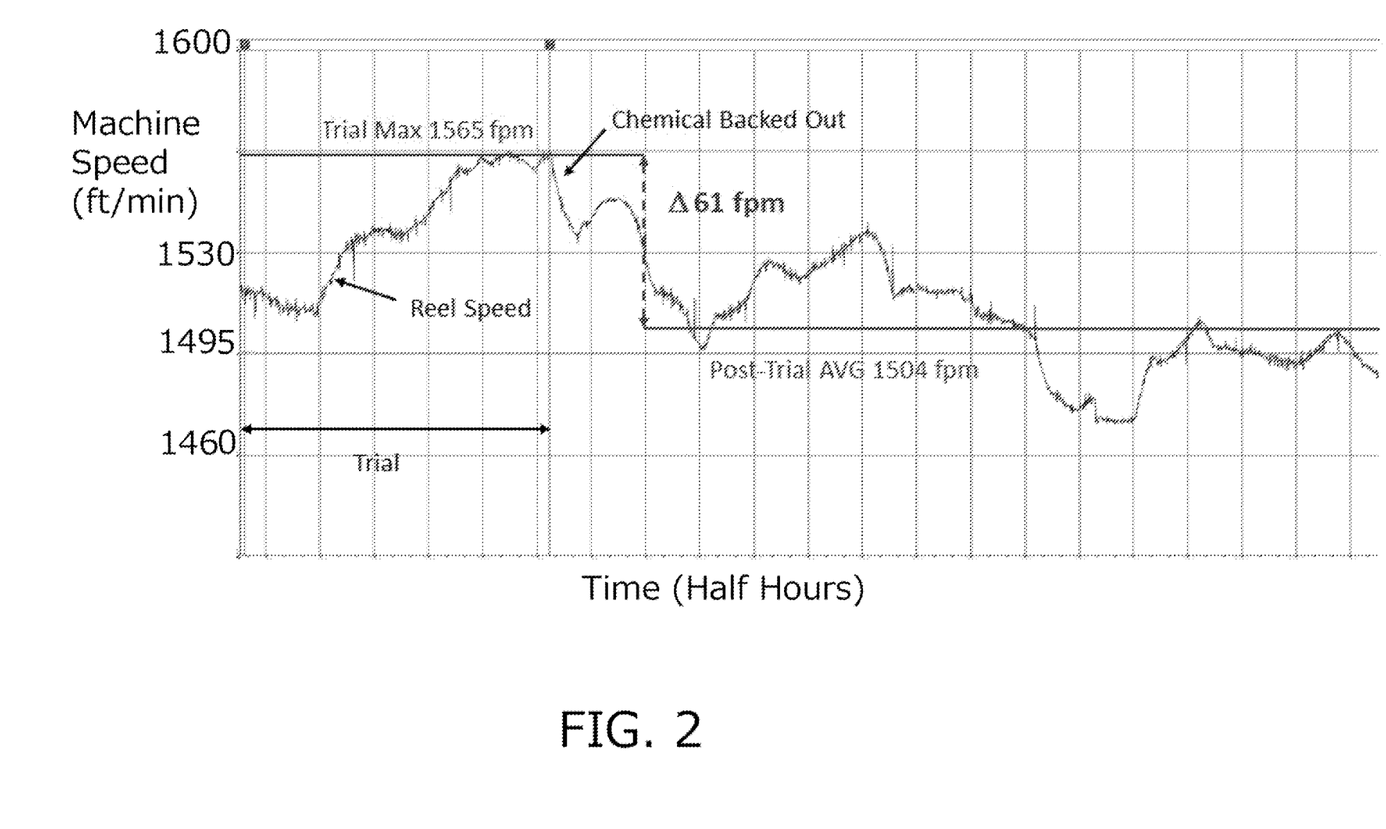
FIG. 2 is a graph of the results of Set 1 of the Examples demonstrating that the methods provided herein improved the freeness of a paper ply as demonstrated by an increase in paper machine speed.

In an exemplary test, the commercially available hybrid coagulant-flocculant composition of the control test was applied to the upper ply substrate along with a commercially available organic cationic coagulant. A dosage of approximately 5 lbs of hybrid coagulant-flocculant composition per ton of dry pulp of the upper ply substrate, measured as total hybrid coagulant-flocculant composition (i.e., 1.75 lb/ton as active hybrid coagulant-flocculant composition) and approximately 20 lbs of organic cationic coagulant, in this case polyDADMAC having a charge density of from about 4 meq/g to about 8 meq/g (available as NALKAT 2020 from Nalco Water, 1601 West Diehl Road, Naperville, Ill. 60563), per ton of dry pulp of the upper ply substrate, measured as total organic cationic coagulant (i.e., 7.4 lb/ton as active organic cationic coagulant for this particular organic cationic coagulant) was applied to the upper ply substrate, a portion of which passed through the upper ply substrate and reached the lower ply substrate. FIG. 1 illustrates that the application of hybrid coagulant-flocculant composition and coagulant to the upper ply substrate resulted in an increase in papermaking speed of about 57 ft/min. FIG. 2 illustrates that, after the hybrid coagulant-flocculant composition and coagulant ceased to pass through to the lower ply, the machine speed declined by 61 ft/min.

Figure 3:
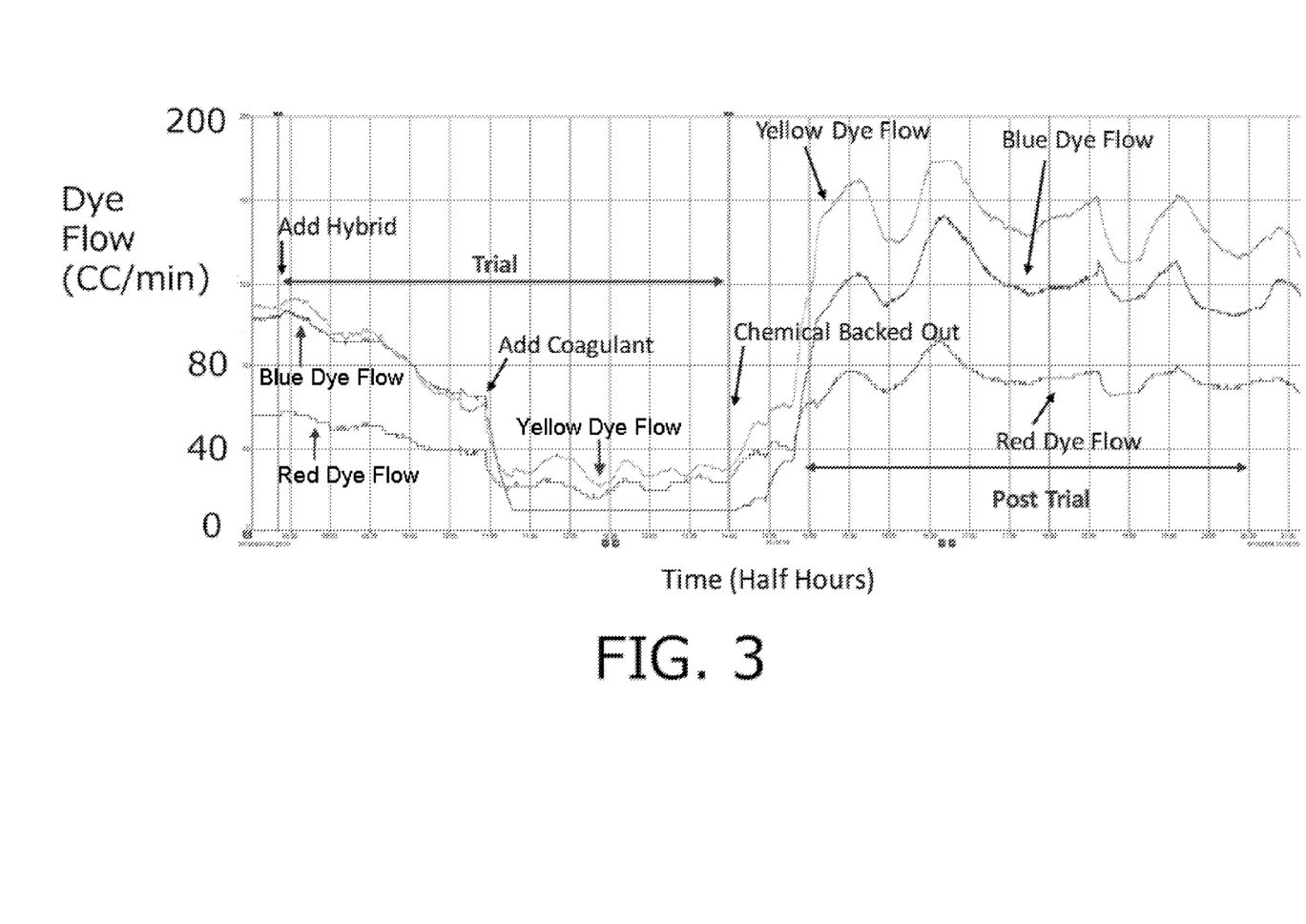
FIG. 3 is a graph of the results of Set 1 of the Examples demonstrating that the methods provided herein improved the dying properties of a substrate.

FIG. 3 illustrates an unexpected result that occurred during the aforementioned exemplary test. The color of the upper ply substrate was controlled by the addition of dyes to the upper ply substrate. The resulting color was measured using a CIELAB type protocol (as described in the reference: *Measurement and Control of the Optical Properties of Paper*, by S. J. Popson et al., Technidyne Corp., New Albany, Ind. (1996)). A controller device was used to actively measure the color and to only add dye added in was an amount sufficient to maintain a pre-determined color. FIG. 3 illustrates that, when the hybrid coagulant-flocculant composition and coagulant were passing through from the upper ply substrate to the lower ply substrate, less dye needed to be added to the upper ply substrate to achieve the desired color. When the application of hybrid coagulant-flocculant composition and coagulant stopped, the need for the dye returned. Specifically, the need for yellow dye decreased by about 70% and the need for blue dye decreased by 100% to maintain the same CIELAB shade target.

Without being limited by a particular theory or design of the invention or of the scope afforded in construing the claims, it is believed that by adding one or more process chemical (such as but not limited to the tested hybrids and coagulants) to the upper (higher) ply of a multiply board machine that composition becomes altered by its passage through the upper ply and conversely adding the same chemistry to the lower ply has a more negative impact on water removal from the lower ply and impedes the ability of the upper ply to drain through the lower ply than the same chemistry has when not passed through the upper ply. The alteration may be rotational, stereo-structural, charged, conformational, or due to the agglomeration to the composition of particles present in the upper ply.

Figure 4:
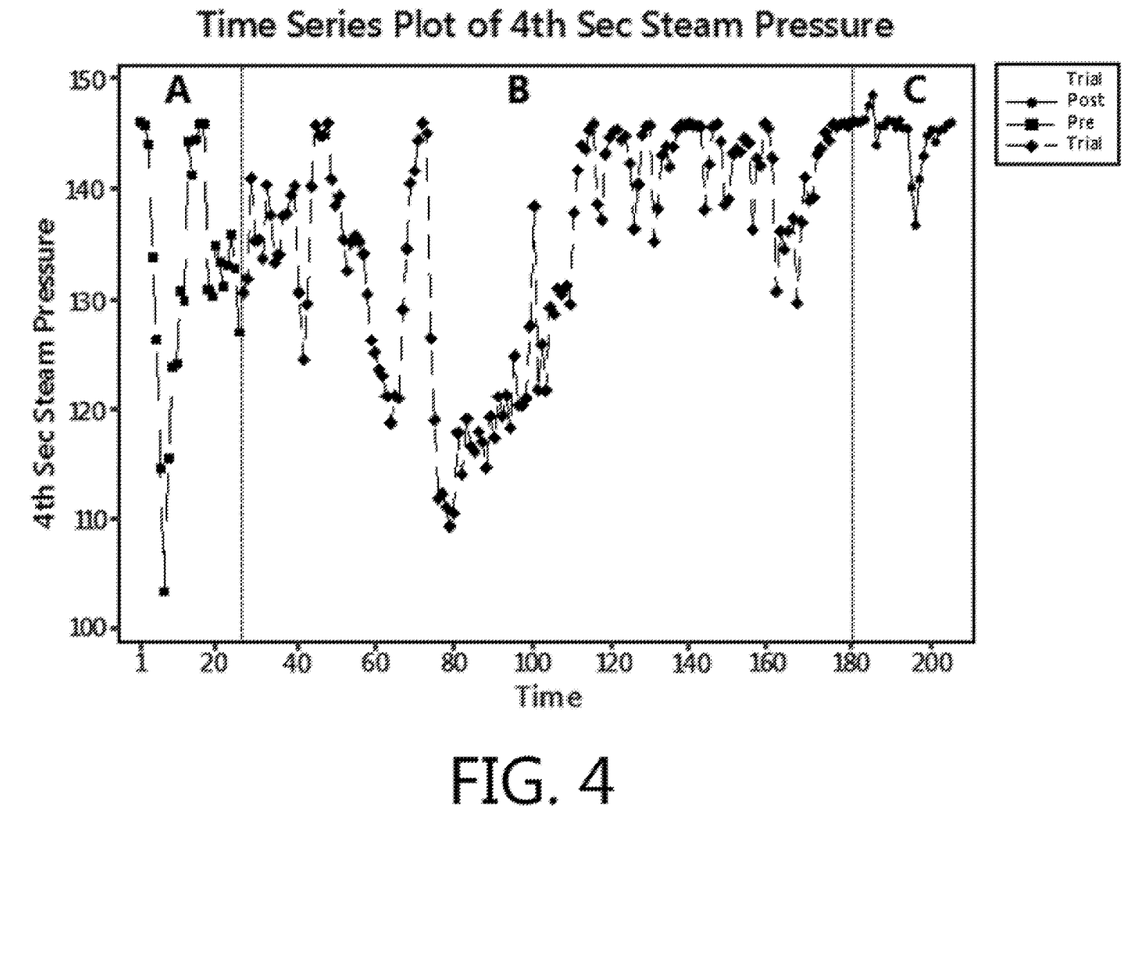
FIG. 4 is a graph of the results of Set 2 of the Examples demonstrating that the methods provided herein improved steam pressure in a fourth section, demonstrating improved drying properties of a substrate.
Figure 5:
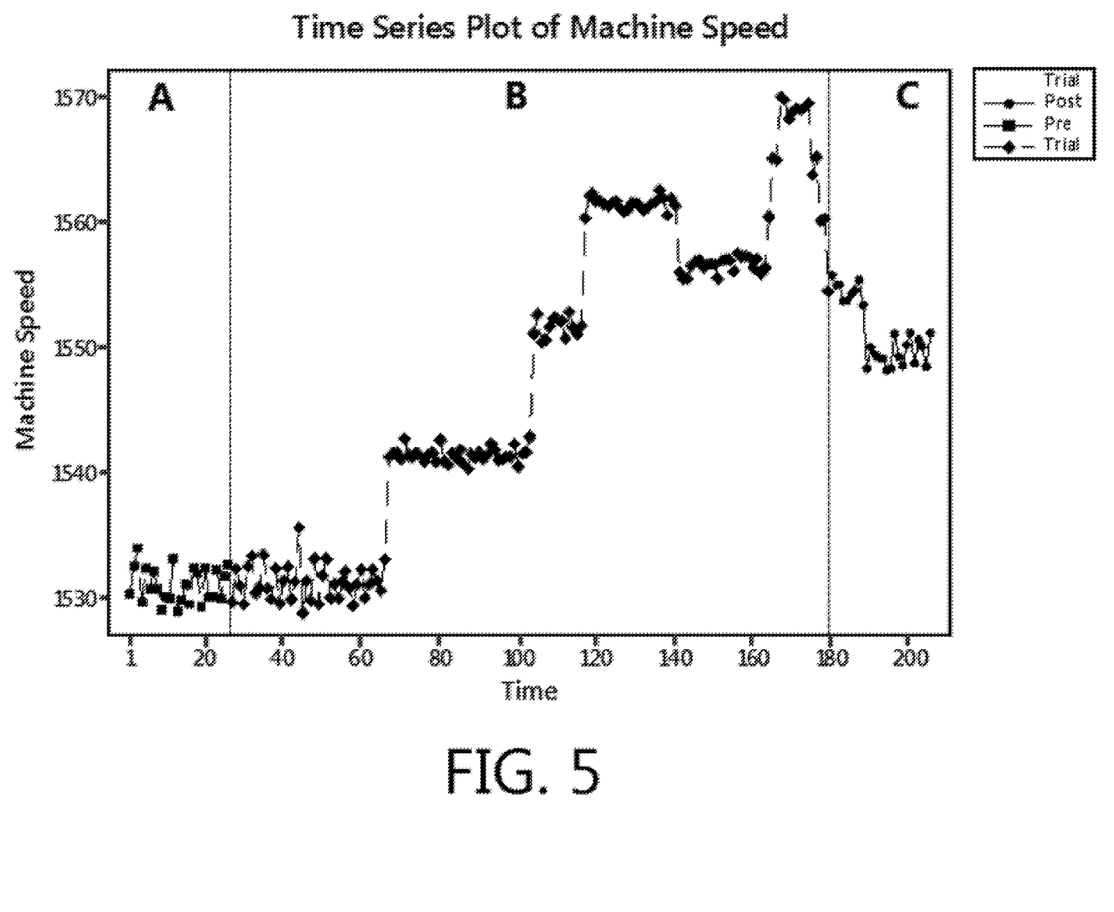
FIG. 5 is a graph of the results of Set 2 of the Examples demonstrating that the methods provided herein improved the freeness of a paper ply as demonstrated by an increase in paper machine speed.
Figure 6:
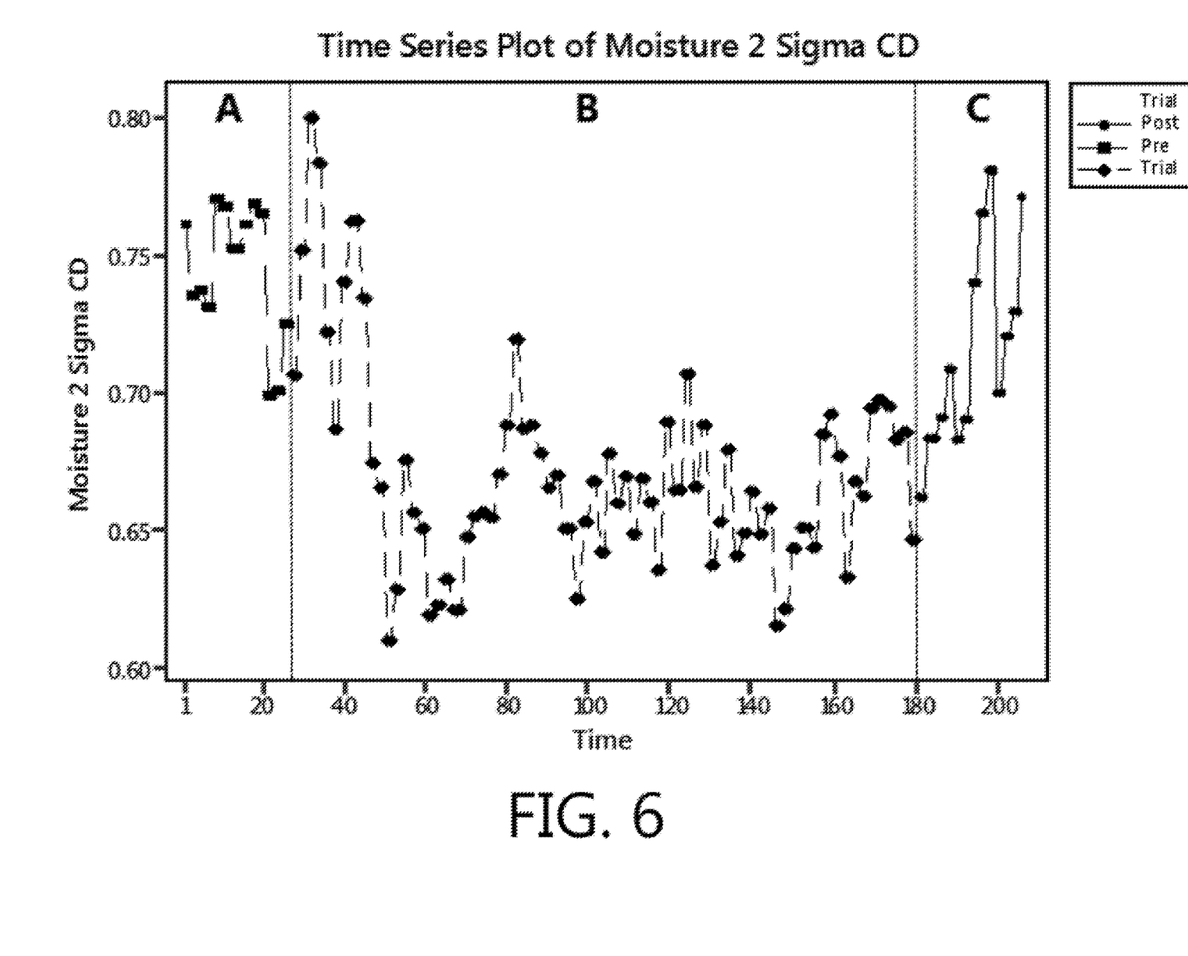
FIG. 6 is a graph of the results of Set 2 of the Examples demonstrating that the methods provided herein improved moisture 2-sigma values, which demonstrates improved consistency of moisture in a paper ply.

Set 2:

The results of a second set of trials are illustrated in FIGS. 4-6. In the second set, the plies were each formed while positioned such that one ply (e.g., an upper ply substrate) was positioned above the other (e.g., a lower ply substrate), with the lower ply being formed prior to the upper ply being formed as in Set 1 described herein. The lower ply was targeted to have superior dry strength properties and was largely made up of softwood with a refining load of 2.5-4.5 hpd/ton of dry fiber of the lower ply. The upper ply was targeted to have superior printing qualities but, unlike Set 1, was largely made up of softwood with a refining load of 3.5-5.5 hpd/ton of dry fiber of the upper ply.

The speed at which the machine was run was adjusted based upon steam pressure available in the fourth section of steam drying (compare FIG. 4 with FIG. 5). The graphs shown in FIGS. 4-6, each of which describes a different property of the same experiment over a time period of approximately 33 hours (note that the time values shown in the graphs of FIGS. 4-6 are of arbitrary units, but are of corresponding values across graphs), are each divided into Sections A, B, and C, which represent pre-trial, trial, and post-trial time periods, respectively. Each of FIGS. 4-6 illustrate a property of papermaking versus time, with the y-axis of FIG. 4 being fourth section steam pressure of the particular papermaking system in psig; the y-axis of FIG. 5 being machine speed in ft/min; and the y-axis of FIG. 6 being cross-directional ("CD") moisture variation (i.e., 2-sigma CD). A reduction in 2-sigma CD moisture variation indicates an improvement in cross-direction sheet quality.

During pre-trial (Section A), the pre-trial machine speed was approximately 1530 ft/min, running a 54-lb basis weight sheet. The pre-trial fourth section steam pressure was approximately 135 psig, and the pre-trial 2-sigma CD moisture variation approximately 0.75. Machine parameters were held approximately constant prior to beginning the trial.

During the trial (Section B), the commercially available hybrid coagulant-flocculant composition of described in Set 1 was applied to the upper ply substrate along with the commercially available organic cationic coagulant as described in Set 1. A dosage of approximately 1 lb of hybrid coagulant-flocculant composition per ton of dry pulp of the upper ply substrate, measured as total hybrid coagulant-flocculant composition (i.e., 0.35 lb/ton as active hybrid coagulant-flocculant composition) and approximately 20 lbs of organic cationic coagulant, in this case polyDADMAC having a charge density of from about 4 meq/g to about 8 meq/g (available as NALKAT 2020 from Nalco Water, 1601 West Diehl Road, Naperville, Ill. 60563), per ton of dry pulp of the upper ply substrate, measured as total organic cationic coagulant (i.e., 7.4 lb/ton as active organic cationic coagulant for this particular organic cationic coagulant) was applied to the upper ply substrate, a portion of which passed through the upper ply substrate and reached the lower ply substrate.

During post-trial (Section C), dosing of the hybrid coagulant-flocculant composition and the coagulant ceased. The result was that the fourdrinier table became wet and sheet moisture increased, causing a decrease in machine speed of approximately 20 ft/min to 1550 ft/min. Post-trial fourth section steam pressure was approximately 145 psig, and post-trial 2-sigma CD moisture variation was approximately 0.72.

FIG. 4 illustrates a drop in steam pressure as the hybrid coagulant-flocculant composition and the coagulant were applied to the upper ply. The increased available steam allowed the machine to run at faster speed, which can be seen in FIG. 5. Machine speed, as illustrated in FIG. 5 and as a result of the application of the application of hybrid coagulant-flocculant composition and coagulant to the upper ply substrate, resulted in an increase in papermaking speed of about 35 ft/min (compare FIG. 5: Section A to Section B at its peak between time values of 160 and 180). FIG. 5 illustrates that, after the hybrid coagulant-flocculant composition and coagulant ceased to pass through to the lower ply, the machine speed declined by approximately 20 ft/min compared to the peak speed. FIG. 6 shows that, during the trial (Section B), 2-sigma CD moisture variation in the product was generally lower than compared to pre-trial (Section A) and post-trial (Section C).

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

The invention claimed is:

1. A method of treating a multi-ply paper production process comprising a lower ply substrate and an upper ply substrate formed adjacent to and above the lower ply substrate, the lower and upper ply substrates passing through the multi-ply paper production process, the method comprising:
    applying coagulant and hybrid coagulant-flocculant composition to the upper ply substrate, the coagulant and the hybrid coagulant-flocculant composition each applied in an amount such that a portion of the coagulant and the hybrid coagulant-flocculant composition passes through the upper ply substrate and drain onto the lower ply substrate;
    wherein pulp utilized to form the lower ply substrate has a freeness of 1.5 to 20 times greater than that of pulp utilized to from the upper ply substrate, per the Canadian Freeness Test protocol.

2. The method of claim 1, wherein the upper ply substrate comprises kraft pulp.

3. The method of claim 1, wherein the coagulant is organic cationic coagulant.

4. The method of claim 3, wherein the organic cationic coagulant is selected from poly-diallyldimethylammonium chloride, epichlorohydrin-dimethyamine copolymer, an allylamine, a diallylamine, dimethylaminoethyl acrylate methyl chloride quaternary salt, dimethyaminoethyl acrylate benzyl chloride quaternary salt, derivatives thereof, multiples thereof, and combinations thereof.

5. The method of claim 3, wherein the organic cationic coagulant has a charge density of from about 0.5 meq/g to about 14 meq/g.

6. The method of claim 3, wherein the organic cationic coagulant has a charge density of from about 4 meq/g to about 8 meq/g.

7. The method of claim 3, wherein the organic cationic coagulant has a charge density of from about 5 meq/g to about 7 meq/g.

8. The method of claim 3, wherein the organic cationic coagulant is poly-diallyldimethylammonium chloride.

9. The method of claim 1, wherein the hybrid coagulant-flocculant composition comprises from about 50 mol % to about 95 mol % acrylamide mer units.

10. The method of claim 1, wherein the coagulant and/or the hybrid coagulant-flocculant composition are applied to the upper ply substrate at a location upstream of an upper ply substrate headbox.

11. The method of claim 1, wherein the coagulant and/or the hybrid coagulant-flocculant composition are applied at a fan pump.

12. The method of claim 1, Wherein the coagulant and the hybrid coagulant-flocculant composition are combined prior to being applied to the upper ply substrate.

13. The method of claim 1, wherein the coagulant and/or the hybrid coagulant-flocculant composition are applied at a location at or upstream from the location where the upper ply substrate contacts the lower ply substrate.

14. The method of claim 1, wherein the lower ply substrate is formed prior to the upper ply substrate being formed.

15. The method of claim 1, wherein the hybrid coagulant-flocculant composition is a cationic copolymer comprising acrylamide and at least one additional cationic mer unit selected from diallyldimethyl ammonium. chloride, an allylamine, a diallylamine, a dialkylaminoalkyl acrylate quaternary salt, a dialkylaminoalkyl acrylate acid salt, a dialkylaminoalkyl methacrylate quaternary salt, a dialkylaminoalkyl methacrylate acid salt, derivatives thereof, multiples thereof, and combinations thereof.

16. The method of claim 1, wherein pulp utilized to form the lower ply substrate has a freeness of 2 to 20 times greater than that of pulp utilized to form the upper ply substrate, per the Canadian Freeness Test protocol.

17. The method of claim 1, wherein pulp utilized to form the upper ply substrate has a freeness of from about 1 mls to about 400 mls, per the Canadian Freeness Test protocol.

18. The method of claim 1, wherein pulp utilized to form the lower ply substrate has a freeness of from about 200 mls to about 800 mls, per the Canadian Freeness Test protocol.

19. The method of claim 1, wherein pulp utilized to form the upper ply substrate has a freeness of from about 30 mls to about 200 mls, and pulp utilized to form the lower ply substrate has a freeness of from about 500 mls to about 700 mls, per the Canadian Freeness Test protocol.

\* \* \* \* \*

UNITED STATES PATENT AND TRADEMARK OFFICE
CERTIFICATE OF CORRECTION

PATENT NO. : 10,280,565 B2
APPLICATION NO. : 15/441623
DATED : May 7, 2019
INVENTOR(S) : Benz et al.

Page 1 of 1

It is certified that error appears in the above-identified patent and that said Letters Patent is hereby corrected as shown below:

In the Claims

At Column 16, Claim 1, Line 37, delete "from" and insert --form--

At Column 16, Claim 1, Line 45, delete "dimethyamine" and insert --dimethylamine--

At Column 16, Claim 1, Line 47, delete "dimethyaminoethyl" and insert --dimethylaminoethyl--

At Column 17, Claim 12, Line 4, delete "Wherein" and insert --wherein--

At Column 17, Claim 15, Line 17, delete "ammonium." and insert --ammonium--

Signed and Sealed this
Sixth Day of August, 2019

Andrei Iancu
*Director of the United States Patent and Trademark Office*